US012228103B2

(12) United States Patent
Takei et al.

(10) Patent No.: US 12,228,103 B2
(45) Date of Patent: Feb. 18, 2025

(54) INTERNAL COMBUSTION ENGINE CONTROL DEVICE

(71) Applicant: Hitachi Astemo, Ltd., Hitachinaka (JP)

(72) Inventors: Hayato Takei, Hitachinaka (JP); Shinya Sato, Hitachinaka (JP); Akihiro Komori, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/562,524

(22) PCT Filed: Feb. 15, 2022

(86) PCT No.: PCT/JP2022/005964
§ 371 (c)(1),
(2) Date: Nov. 20, 2023

(87) PCT Pub. No.: WO2022/264513
PCT Pub. Date: Dec. 22, 2022

(65) Prior Publication Data
US 2024/0240602 A1 Jul. 18, 2024

(30) Foreign Application Priority Data
Jun. 17, 2021 (JP) .................. 2021-100613

(51) Int. Cl.
*F02P 5/15* (2006.01)
*F02D 41/00* (2006.01)

(52) U.S. Cl.
CPC .......... *F02P 5/1502* (2013.01); *F02D 41/009* (2013.01); *F02D 2200/024* (2013.01); *F02D 2200/101* (2013.01)

(58) Field of Classification Search
CPC ............. F02D 41/0057; F02D 41/0085; F02D 41/009; F02D 41/1454; F02D 41/1498;
(Continued)

(56) References Cited

U.S. PATENT DOCUMENTS 7,624,718 B2   12/2009   Konakawa
9,470,174 B2   10/2016   Iwai et al.
(Continued)

FOREIGN PATENT DOCUMENTS

JP   2007-170203 A   7/2008
JP   2013-113175 A   6/2013
(Continued)

OTHER PUBLICATIONS

International Search Report (PCT/ISA/210) issued in PCT Application No. PCT/JP2022/005964 dated Apr. 26, 2022 with English translation (4 pages).
(Continued)

*Primary Examiner* — Logan M Kraft
*Assistant Examiner* — Johnny H Hoang
(74) *Attorney, Agent, or Firm* — Crowell & Moring LLP

(57) ABSTRACT

An internal combustion engine control device includes: a rotation speed calculating unit that calculates crank rotation speeds of an engine; an extreme timing calculating unit that calculates an extreme timing of the crank rotation speeds; and an average rotation speed calculating unit that calculates an average rotation speed of the crank rotation speeds; and a combustion state estimating unit that estimates a combustion state in the engine based on the extreme timing and the average rotation speed.

5 Claims, 13 Drawing Sheets

(58) Field of Classification Search
CPC ............ F02D 41/2441; F02D 41/3029; F02D 41/3041; F02D 41/3094; F02D 41/401; F02D 41/402; F02D 2200/101; F02D 2200/1015; F02N 11/04; Y02T 10/40; Y02T 10/62

See application file for complete search history.

(56) References Cited

U.S. PATENT DOCUMENTS

| | | |
|---|---|---|
| 2008/0289603 A1 | 11/2008 | Konakawa |
| 2014/0299107 A1 | 10/2014 | Iwai et al. |
| 2016/0131071 A1* | 5/2016 | Sugimoto ............ F02D 41/1498 123/436 |
| 2021/0062746 A1* | 3/2021 | Hashimoto ......... F02D 41/2406 |
| 2022/0220908 A1* | 7/2022 | Sukegawa ............. F02D 35/028 |
| 2023/0054131 A1* | 2/2023 | Sukegawa ........... F02D 41/0097 |

FOREIGN PATENT DOCUMENTS

| | | |
|---|---|---|
| JP | 2020-190234 A | 11/2020 |
| WO | WO 2005/073548 A1 | 8/2005 |

OTHER PUBLICATIONS

Japanese-language Written Opinion (PCT/ISA/237) issued in PCT Application No. PCT/JP2022/005964 dated Apr. 26, 2022 with English translation (7 pages).

\* cited by examiner

INTERNAL COMBUSTION ENGINE CONTROL DEVICE

TECHNICAL FIELD

The present invention relates to an internal combustion engine control device.

BACKGROUND ART

In recent years, regarding vehicles such as automobiles, regulations on fuel consumption and harmful components in exhaust gas have been tightened, and there is a demand for an engine (internal combustion engine) that is highly efficient and has lower exhaust emissions.

Under such circumstances, a technology of estimating a combustion state in an engine combustion chamber and controlling an engine on the basis of an estimation result is known. It is considered that the thermal efficiency of an engine can be improved by appropriately controlling an ignition time, a fuel injection timing, or the like according to the estimated combustion state. PTL 1 discloses an example of the technology of estimating a combustion state, for example.

PTL 1 describes "an internal combustion engine control device including: a rotation speed calculating unit that calculates a crank rotation speed of an internal combustion engine; an extreme timing calculating unit that calculates an extreme timing of the crank rotation speed calculated by the rotation speed calculating unit; combustion state estimating unit that estimates a combustion state based on the extreme timing of the crank speed calculated by the extreme timing calculating unit".

CITATION LIST

Patent Literature

PTL 1: JP 2020-190234 A

SUMMARY OF INVENTION

Technical Problem

In the internal combustion engine control device described in PTL 1, a crank rotation speed from which cycle variations are removed is calculated by averaging crank rotation speeds in a predetermined number of cycles when the crank rotation speed is calculated. However, combustion in the engine involves cycle fluctuations for various reasons, and the crank rotation speed and a combustion state technically vary in values for each cycle.

If the average number of cycles is sufficiently large (for example, 100 cycles), cycle variations can be almost eliminated; however, since it is necessary to wait for estimation of the combustion state until an average is obtained, there is a possibility that responsiveness of estimation of the combustion state and ignition control or the like based on the estimation will deteriorate. On the other hand, when the average number of cycles is small (for example, 10 cycles), the responsiveness of estimation is improved, but the cycle variations cannot be completely removed, and the estimation accuracy of the combustion state deteriorates. As described above, in the related art, the estimation accuracy of the combustion state and the responsiveness of the estimation are in a trade-off relationship.

Here, the fact that the estimation accuracy of the combustion state and the responsiveness of the estimation are in a trade-off relationship will be described with reference to FIG. 1.

FIG. 1 illustrates graphs indicating a relationship between an estimation result of a combustion centroid estimated by an internal combustion engine control device and an estimation error in the related art.

A graph (1) provided at an upper left-hand portion of FIG. 1 is a graph illustrating an example of an estimated value of the combustion centroid when the average number of cycles is small.

A graph (2) provided at an upper right-hand portion of FIG. 1 is a graph illustrating an example of an estimated value of the combustion centroid when the average number of cycles is large.

In the graphs (1) and (2), the horizontal axis represents a measured value of the combustion centroid, and the vertical axis represents the estimated value of the combustion centroid.

Here, an example is illustrated in which the internal combustion engine control device estimates a combustion centroid MFB50 as a combustion state and compares the estimated combustion centroid with a measured value of the combustion centroid MFB50 calculated from an in-cylinder pressure. The mass fraction burned (MFB) is a percentage of a mass of a combusted portion to a mass of an entire air-fuel mixture, and the combustion centroid MFB50 indicates a combustion phase (crank angle) when the mass fraction burned becomes 50%.

A straight line extending diagonally upward to a right-hand side from the origin illustrated in the graphs (1) and (2) indicates an ideal state in which the measured value and the estimated value of the combustion centroid coincide with each other.

A graph (3) provided at a lower portion in FIG. 1 is a graph illustrating a relationship between the average number of cycles and an estimation error in the combustion centroid. The horizontal axis of the graph (3) represents the average number of cycles, and the vertical axis represents the estimation error in the combustion centroid.

As illustrated in the graph (1), when the average number of cycles is small, the responsiveness of estimation processing of the combustion centroid is good. However, many intersections of measured values and estimated values of the combustion centroid are plotted around the straight line of the graph (1). That is, when the average number of cycles is small, the estimation accuracy of the combustion centroid decreases.

On the other hand, when the average number of cycles is large as illustrated in the graph (2), the responsiveness of the process of estimating the combustion centroid deteriorates. However, the intersections of measured values and estimated values of the combustion centroid are plotted on the straight line of the graph (2). That is, when the average number of cycles is large, the estimation accuracy of the combustion centroid becomes high.

The present invention has been made in view of such a situation, and an object thereof is to provide an internal combustion engine control device capable of achieving both estimation accuracy and responsiveness of estimation of a combustion state.

Solution to Problem

An internal combustion engine control device includes: a rotation speed calculating unit that calculates a crank rotation speed of an internal combustion engine; an extreme timing calculating unit that calculates an extreme timing of the crank rotation speed; and an average rotation speed calculating unit that calculates an average rotation speed of the crank rotation speed; and a combustion state estimating unit that estimates a combustion state of the internal combustion engine based on the extreme timing and the average rotation speed.

Advantageous Effects of Invention

According to the present invention, it is possible to provide an internal combustion engine control device that controls an internal combustion engine while achieving both estimation accuracy of a combustion state and responsiveness of estimation.

Problems, configurations, and effects other than those described above will be clarified by the following description of embodiments.

DESCRIPTION OF EMBODIMENTS

Figure 1:
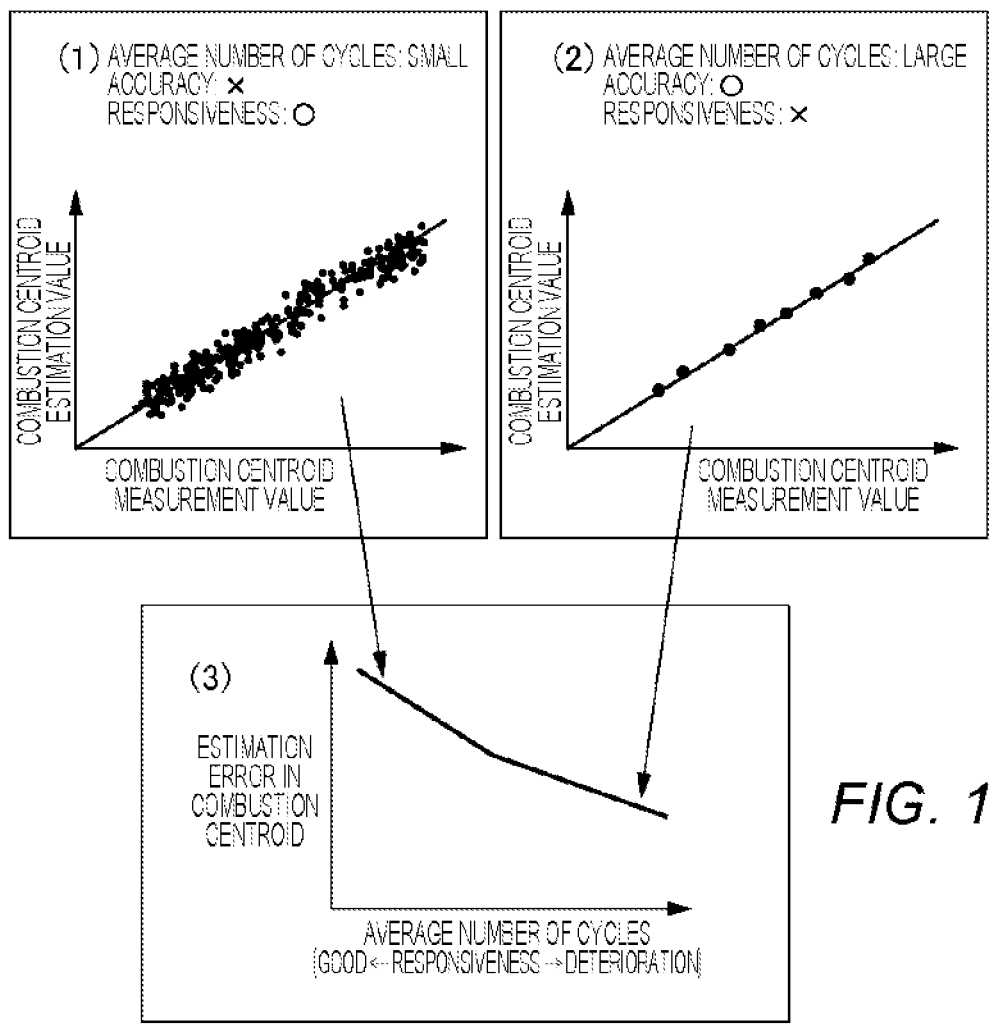
FIG. 1 illustrates graphs indicating a relationship n result of a combustion centroid estimated by an internal combustion engine control device and an estimation error in the related art.

Hereinafter, embodiments of the present invention will be described with reference to the accompanying drawings. In this specification and the drawings, components having substantially the same function or configuration are denoted by the same reference numerals, and redundant description thereof is omitted.

First Embodiment

[Configuration Example of Internal Combustion Engine]

First, a configuration example of an internal combustion engine according to a first embodiment of the present invention will be described.

Figure 2:
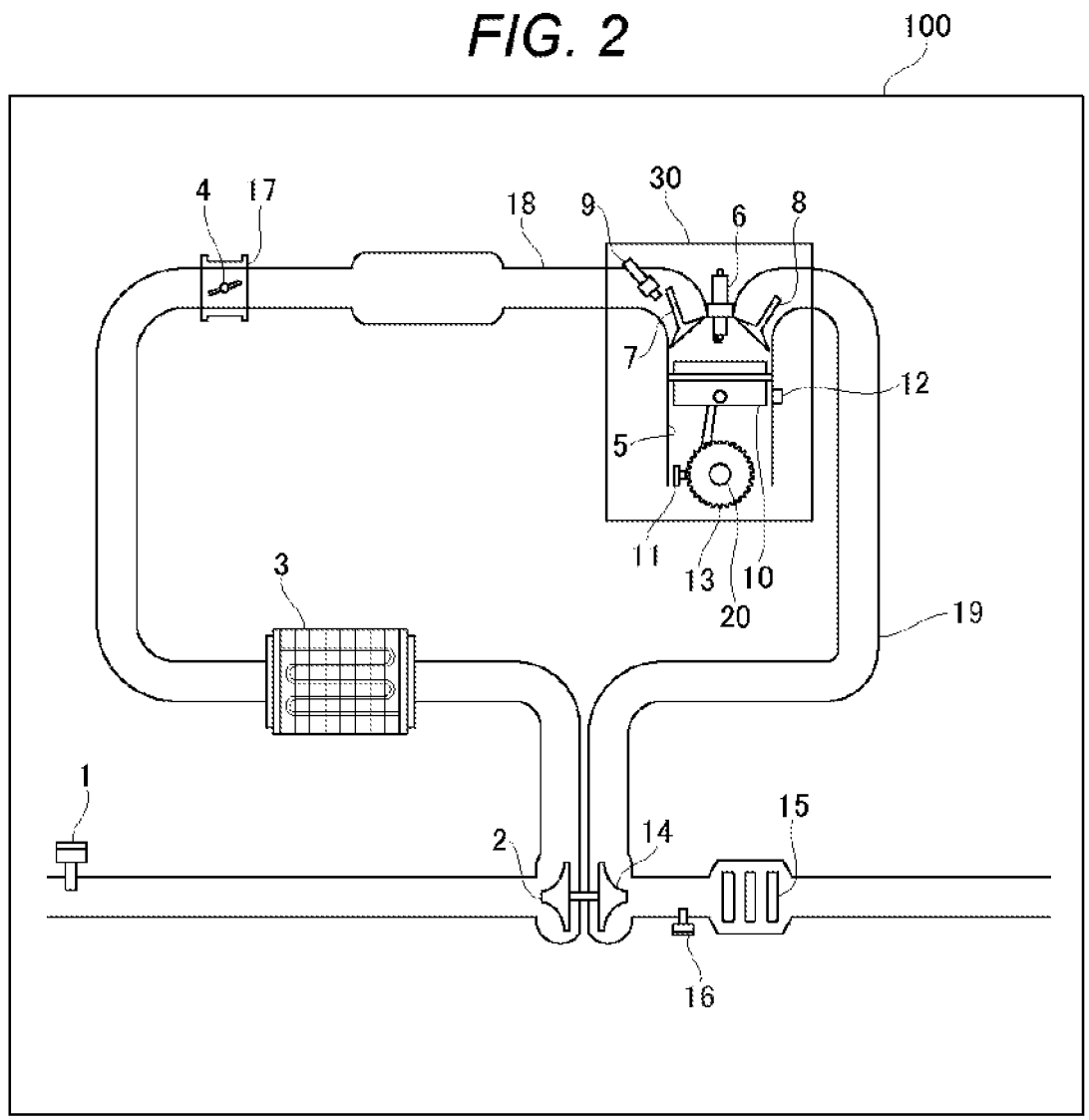
FIG. 2 is a schematic view illustrating an overall configuration example of an engine according to a first embodiment of the present invention.

FIG. 2 is a schematic view illustrating an overall configuration example of an engine 100 (an example of an internal combustion engine).

A combustion chamber of the engine 100 is formed by an engine head, a cylinder 5, a piston 10, an intake valve 7, and an exhaust valve 8. An ignition plug 6 is attached to the engine head. Air taken in from the outside of the engine 100 passes through a compressor 2, an intercooler 3, a throttle valve 4, and an intake port 18 and is taken into the combustion chamber when the intake valve 7 is opened.

A fuel is injected by a fuel injection valve 9 provided at the intake port 18, and when the intake valve 7 is opened, the fuel is taken into the combustion chamber together with air taken from the outside. Accordingly, in the combustion chamber, the ignition plug 6 is ignited at a predetermined combustion timing, and an air-fuel mixture in which air and fuel are mixed is combusted. The air-fuel mixture after combustion in the combustion chamber is discharged as exhaust gas from the combustion chamber when the exhaust valve 8 is opened.

This exhaust gas is discharged to the outside of the engine 100 through an exhaust port 19, a turbine 14, and a catalyst 15.

The engine 100 has an air flow sensor 1 for measuring the amount of air taken into the combustion chamber, a throttle sensor 17 for detecting an opening degree of the throttle valve 4, a water temperature sensor 12 for measuring the cooling water temperature, and an air-fuel ratio sensor 16.

Further, a signal rotor 13 is provided at a shaft portion of a crankshaft 20. A crank angle sensor 11 disposed on the signal rotor 13 detects a signal of the signal rotor 13.

Figure 3:
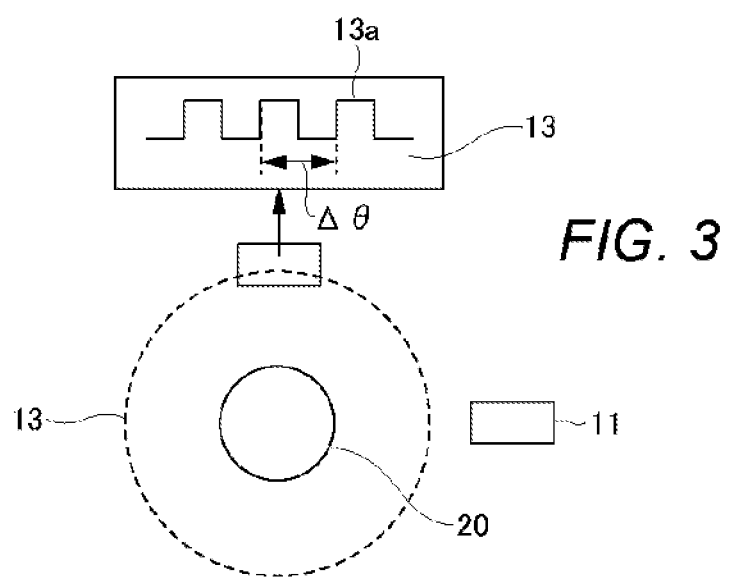
FIG. 3 is a view illustrating a principle of calculating a crank rotation speed by using a crank angle sensor and a signal rotor according to the first embodiment of the present invention.

FIG. 3 is a view illustrating a principle of calculating a crank rotation speed by using the crank angle sensor 11 and the signal rotor 13. FIG. 3 illustrates a view of installation positions of the crank angle sensor 11 and the signal rotor 13 and a partially enlarged view of the signal rotor 13.

On a circumference of the signal rotor 13 attached to the crankshaft 20 of the engine, signal teeth 13a are provided at constant angular intervals $\Delta\theta$ as illustrated in the partially enlarged view in an upper part of FIG. 3. The crank angle sensor 11 detects a time difference $\Delta t$ in which the adjacent signal teeth 13a pass by a detector of the crank angle sensor 11. Accordingly, the crank angle sensor 11 obtains a crank rotation speed $\omega=\Delta\theta/\Delta t$ (rad/s). With such a calculation principle of the rotation speed, the crank angle sensor 11 calculates the crank rotation speed for each rotation angle $\Delta\theta$.

[Configuration Example of Control Device]

Figure 4:
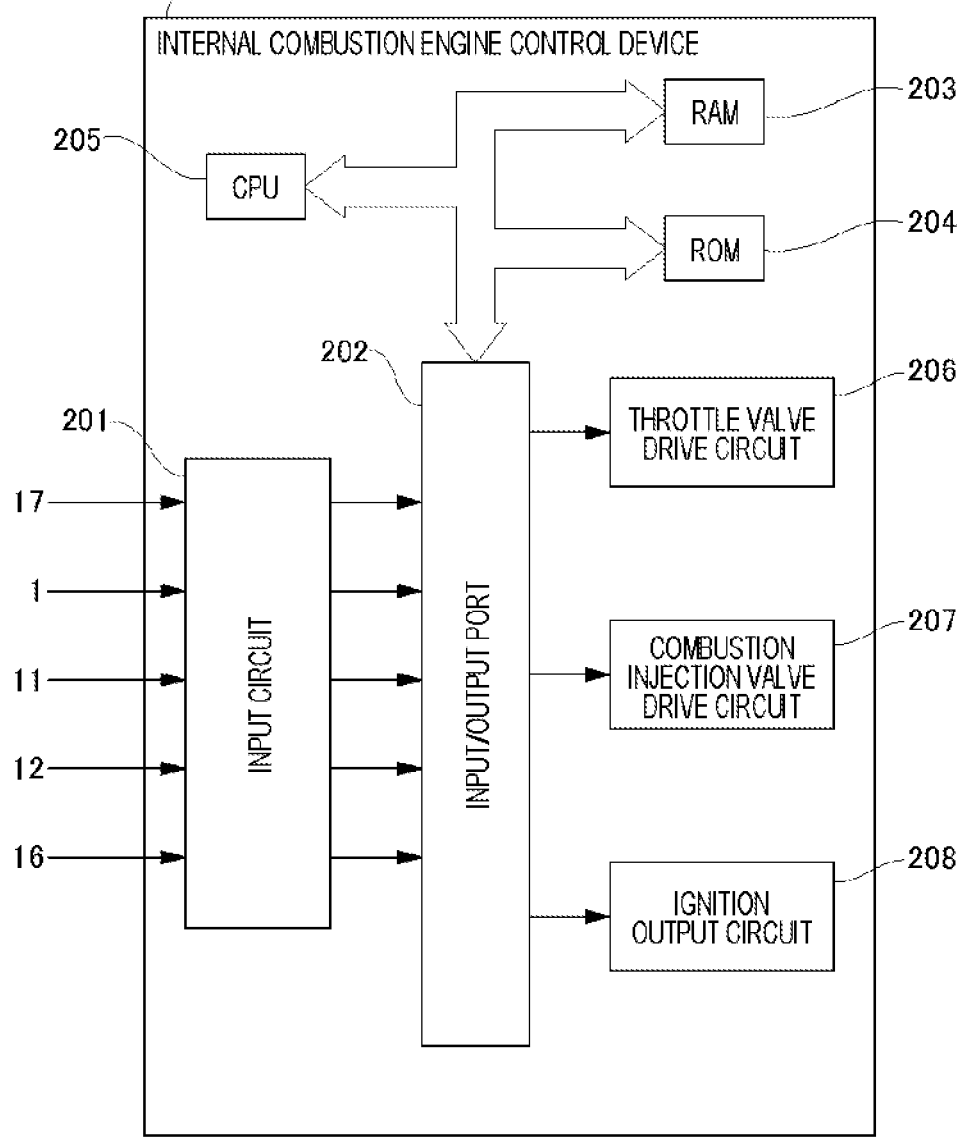
FIG. 4 is a block diagram illustrating a configuration example of an internal combustion engine control device according to the first embodiment of the present invention.

FIG. 4 is a block diagram illustrating a configuration example of an internal combustion engine control device 200.

The internal combustion engine control device 200 includes an input circuit 201, an input/output port 202, a random access memory (RAM) 203, a read only memory (ROM) 204, a central processing unit (CPU) 205, a throttle valve drive circuit 206, a combustion injection valve drive circuit 207, and an ignition output circuit 208.

Output signals from various sensors are input to the input circuit 201. FIG. 4 illustrates an example in which output signals of the throttle sensor 17, the air flow sensor 1, the crank angle sensor 11, the water temperature sensor 12, and the air-fuel ratio sensor 16 are input to the input circuit 201 of the internal combustion engine control device 200. A signal input to the input circuit 201 is transmitted to the input/output port 202.

The signal transmitted to the input/output port 202 is stored in the RAM 203 and is subjected to arithmetic processing by the CPU 205. A control program in which the contents of the arithmetic processing are described is written in advance in the ROM 204 and is executed by the CPU 205. The ROM 204 records programs, data, and the like necessary for an operation of the CPU 205 and is used as an example of a computer-readable non-transitory storage medium in which programs to be executed by the internal combustion engine control device 200 are stored.

A control signal computed by the CPU 205 in accordance with the control program is output to each circuit such as the throttle valve drive circuit 206, the combustion injection valve drive circuit 207, or the ignition output circuit 208.

The throttle valve drive circuit 206 outputs a drive signal for controlling opening/closing drive of the throttle valve 4 to the throttle valve 4.

The combustion injection valve drive circuit 207 outputs a drive signal for controlling opening/closing drive of the fuel injection valve 9 at a fuel injection timing to the fuel injection valve 9.

The ignition output circuit 208 outputs a drive signal for controlling ignition of the ignition plug 6 at an ignition timing to the ignition output circuit 208.

[Configuration Example of Combustion Controller]

Figure 5:
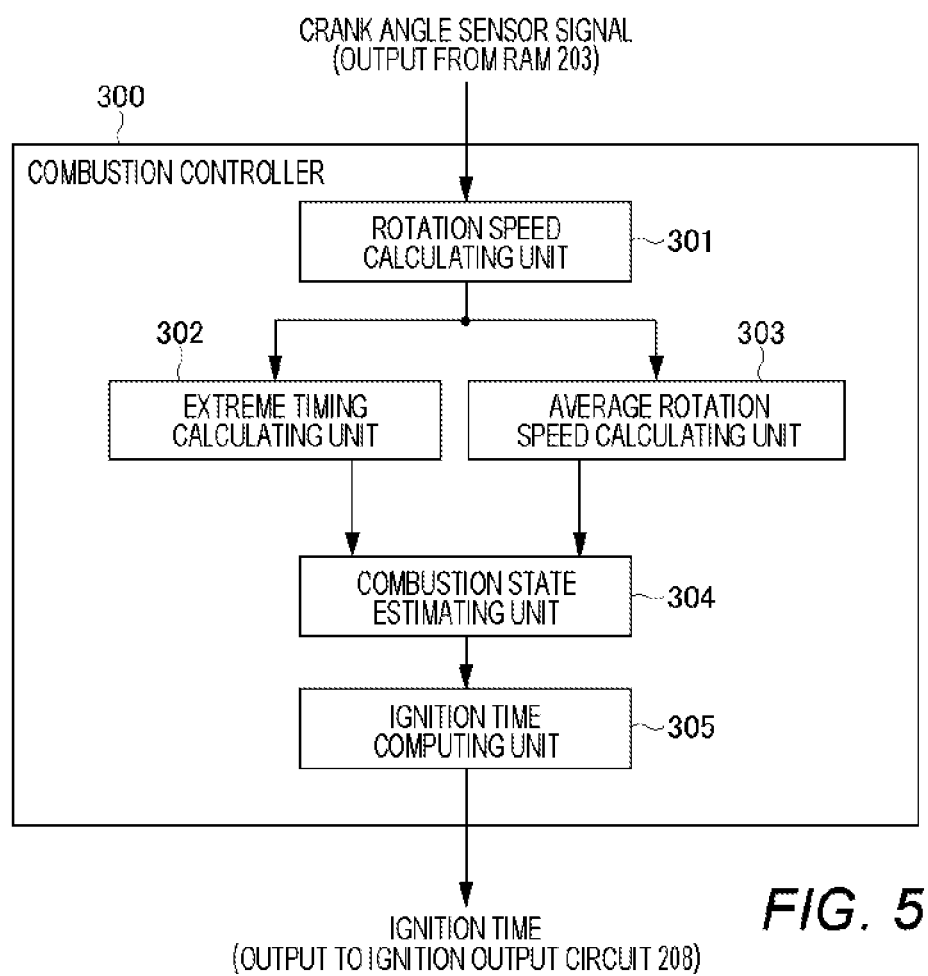
FIG. 5 is a block diagram illustrating a configuration example of a combustion controller according to the first embodiment of the present invention.

FIG. 5 is a block diagram illustrating a configuration example of a combustion controller 300.

The combustion controller 300 is one of functional units mounted on the CPU 205 and has a function of estimating a combustion state and a function of controlling an ignition time on the basis of the estimated combustion state.

The combustion controller 300 includes a rotation speed calculating unit 301, an extreme timing calculating unit 302, an average rotation speed calculating unit 303, a combustion state estimating unit 304, and an ignition time computing unit 305.

The rotation speed calculating unit (rotation speed calculating unit 301) calculates a crank rotation speed of the internal combustion engine (engine 100).

The extreme timing calculating unit (extreme timing calculating unit 302) calculates an extreme timing of the crank rotation speed.

The average rotation speed calculating unit (average rotation speed calculating unit 303) calculates an rotation speed of the crank rotation speed.

The combustion state estimating unit (combustion state estimating unit 304) estimates a combustion state of the internal combustion engine (engine 100) based on the extreme timing and the average rotation speed. The combustion state of the internal combustion engine (engine 100) estimated by the combustion state estimating unit (combustion state estimating unit 304) is a combustion phase when the mass fraction burned becomes 50%.

The ignition time computing unit (ignition time computing unit 305) performs combustion control of the internal combustion engine (engine 100) according to the ignition time computed based on the combustion state estimated by the combustion state estimating unit (combustion state estimating unit 304).

Hereinafter, a detailed function of each unit of the combustion controller 300 will be described with reference to the drawings.

First, processing of the rotation speed calculating unit 301 will be described.

Figure 6:
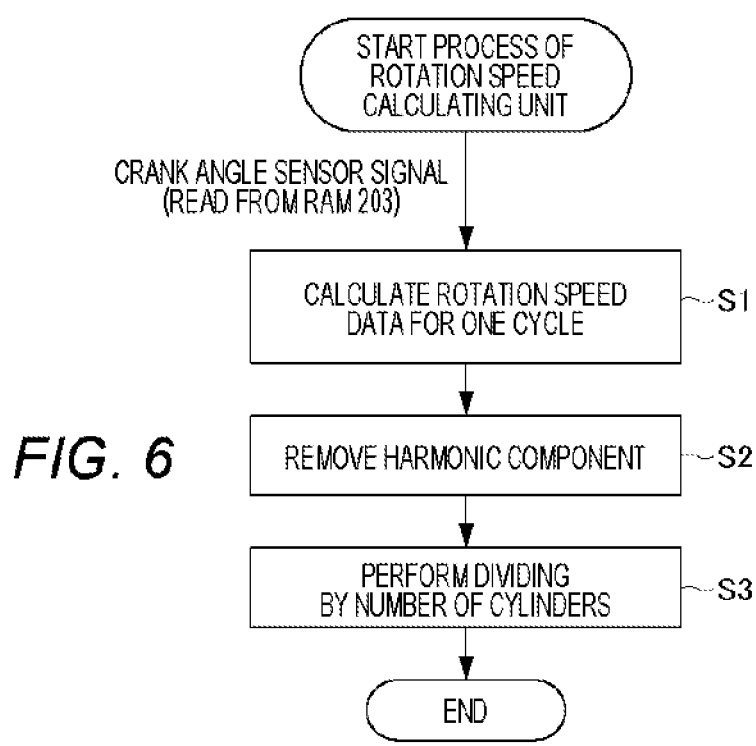
FIG. 6 is a flowchart illustrating a procedure example of processing performed by a rotation speed calculating unit according to the first embodiment of the present invention.

FIG. 6 is a flowchart illustrating a procedure example of processing performed by the rotation speed calculating unit 301.

The rotation speed calculating unit 301 reads a signal (crank angle sensor signal) of the signal rotor 13 detected by the crank angle sensor 11 from the RAM 203 and calculates a crank rotation speed for each rotation angle $\Delta\theta$ based on the calculation principle illustrated in FIG. 3 (S1). The rotation speed calculating unit 301 imports a crank rotation speed series obtained for each rotation angle $\Delta\theta$ as rotation speed data for one cycle (crank angle 720° period) of the engine 100. For example, when $\Delta\theta=10°$, the rotation speed calculating unit 301 imports a crank rotation speed series including a total of 72 points from a crank angle of 0° to 710°.

Next, the rotation speed calculating unit 301 obtains a crank rotation speed series obtained by removing harmonic components from the crank rotation speed series (S2). This process is performed to remove fluctuation components of harmonics which are not related to combustion, from the crank rotation speed.

Next, the rotation speed calculating unit (rotation speed calculating unit 301) divides the crank rotation speed series in a period in which the crank angle is 720° by the number of cylinders (S3). Accordingly, the rotation speed calculating unit (rotation speed calculating unit 301) allocates the crank rotation speed series in a period including an expansion stroke of each cylinder as the crank rotation speed series in the cylinder.

Here, division processing of the crank rotation speed series performed by the rotation speed calculating unit 301 is described with reference to FIGS. 7 and 8.

Figure 7:
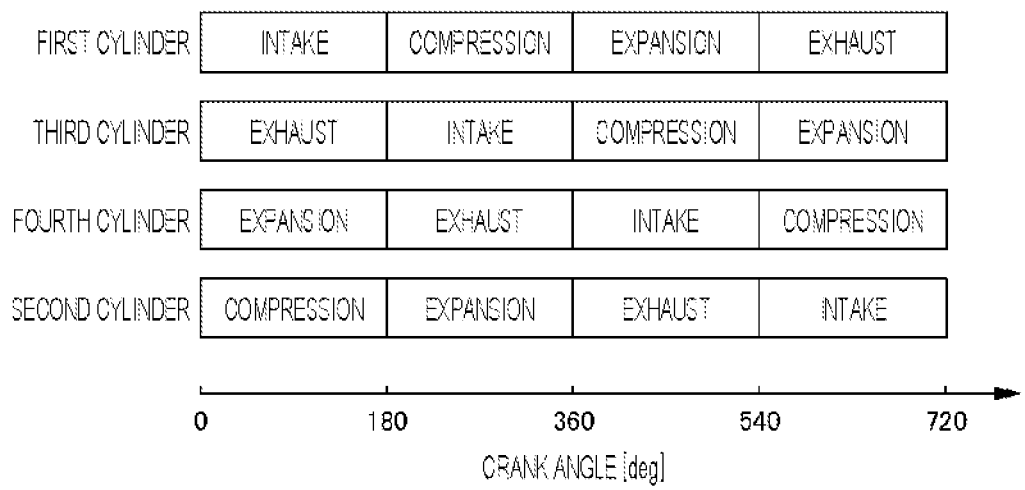
FIG. 7 is a diagram illustrating sequences of individual strokes of a four-cylinder four-cycle engine according to the first embodiment of the present invention.

FIG. 7 is a diagram illustrating sequences of individual strokes of a four-cylinder four-cycle engine.

In a four-cycle engine, four strokes of intake, compression, expansion, and exhaust are performed in order. In addition, in the 4-cylinder engine, the stroke between the cylinders is shifted by a crank angle of 180°. When the ignition of the engine is performed in the order of a first cylinder, a third cylinder, a fourth cylinder, and a second cylinder, the stroke of the third cylinder is delayed by 180° with respect to the first cylinder, the stroke of the fourth cylinder is delayed by 360° with respect to the first cylinder, and the stroke of the second cylinder is delayed by 540° with respect to the first cylinder.

In the expansion stroke, the combustion torque generated by the combustion of each cylinder pushes down the piston 10 of the cylinder, and the piston 10 rotates the crankshaft. In this respect, in a process of Step S3, the rotation speed calculating unit 301 divides the crank rotation speed series of the entire cycle (crank angle of 0 to 720°) into windows having a crank angle of 180° including the expansion stroke of each cylinder.

Figure 8:
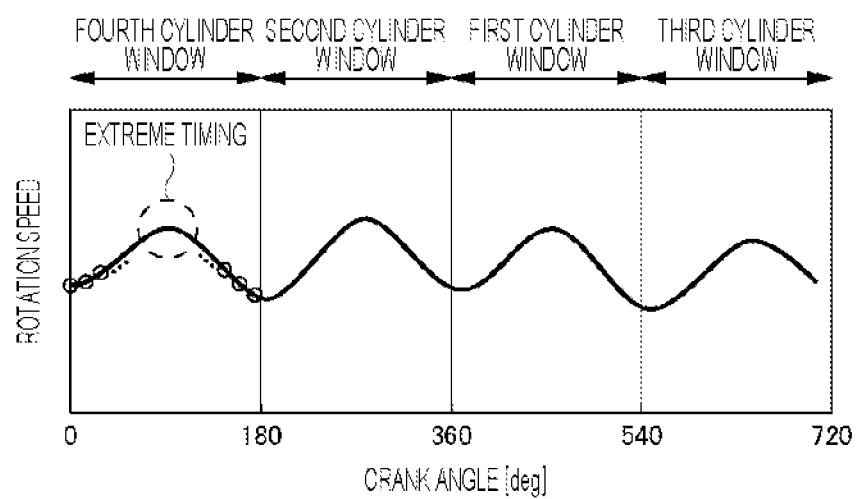
FIG. 8 is a graph illustrating an example in which a window having a width of 180° is set to center an expansion stroke of each cylinder thereon with respect to a crank rotation speed series according to the first embodiment of the present invention.

FIG. 8 is a graph illustrating an example in which a window having a width of 180° is set to center the expansion stroke of each cylinder thereon with respect to a crank rotation speed series. In FIG. 8, the horizontal axis represents the crank angle, and the vertical axis represents the rotation speed. A plurality of circles added along the graph of the rotation speed of the fourth cylinder represent the crank rotation speeds acquired for each crank angle of 40=10°.

The center of the expansion stroke of the fourth cylinder has a crank angle of 90°, and a section with a width of 180° (section with a crank angle of 0 to 180°) on which the center of the expansion stroke is centered is allocated as a window of the fourth cylinder. As described above, since the crank rotation speed series including a total of 72 points from the crank angle of 0° to 710° is provided, the section with the width of 180° includes the crank rotation speed series including 18 points. The circles indicate that the fourth cylinder in FIG. 8 includes 18-point crank rotation speed series.

Similarly to the fourth cylinder, the rotation speed calculating unit 301 allocates a section with a crank angle of 180 to 360° as a window of the second cylinder, a section with a crank angle of 360 to 540° as a window of the first cylinder, and a section with a crank angle of 540 to 720° as a window of the third cylinder.

Next, processing of the extreme timing calculating unit 302 will be described.

Figure 9:
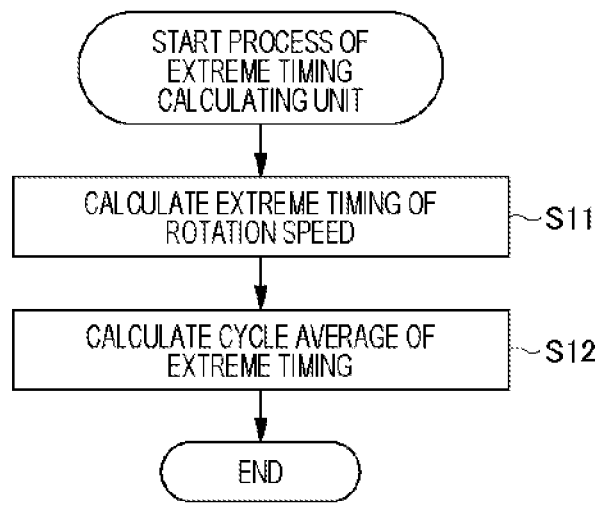
FIG. 9 is a flowchart illustrating a processing example performed by an extreme timing calculating unit according to the first embodiment of the present invention.

FIG. 9 is a flowchart illustrating a processing example performed by the extreme timing calculating unit 302.

First, the extreme timing calculating unit 302 calculates a crank angle (referred to as "extreme timing") at which the crank rotation speed of each cylinder becomes an extreme from the crank rotation speed series assigned to the cylinder (S11).

Next, the extreme timing calculating unit 302 calculates a cycle average of extreme timings (S12).

Next, processing of the average rotation speed calculating unit 303 will be described.

Figure 10:
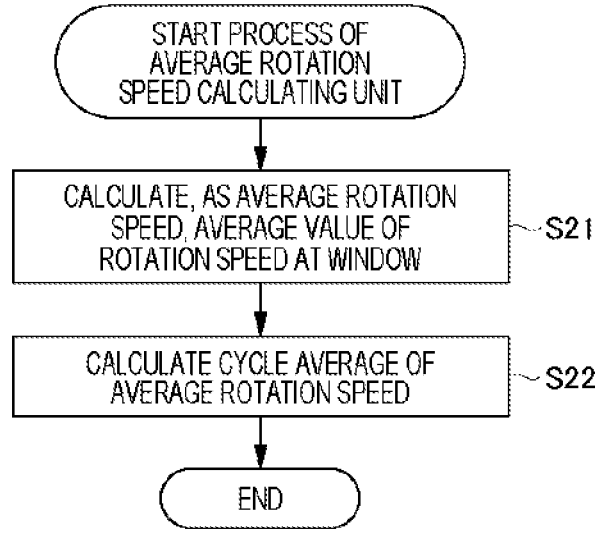
FIG. 10 is a flowchart illustrating a processing example performed by an average rotation speed calculating unit according to the first embodiment of the present invention.

FIG. 10 is a flowchart illustrating a processing example performed by the average rotation speed calculating unit 303.

The average rotation speed calculating unit (average rotation speed calculating unit 303) sets an average value of the crank rotation speed series allocated to each cylinder as an average rotation speed of the cylinder. For example, the average rotation speed calculating unit 303 calculates an average value of crank rotation speeds of each cylinder as an average rotation speed from the crank rotation speed series allocated to the cylinder at the center of the expansion stroke (S21). The average rotation speed is an average value of the crank rotation speed series of the entire cycle (crank angle of 0 to 720°) in the window of the cylinder. That is, the average rotation speed in each crank rotation speed series is calculated from 18 rotation speeds detected for each cylinder.

Next, the average rotation speed calculating unit 303 calculates a cycle average of the average rotation speed (S22).

The combustion state estimating unit 304 estimates a combustion state based on the extreme timing and the average rotation speed of each cylinder. The combustion state is estimated by calculating a combustion phase (for example, the combustion centroid MFB50) of the cylinder. A method of calculating the combustion phase in the combustion state estimating unit 304 will be described with reference to FIGS. 11 to 15.

Figure 11:
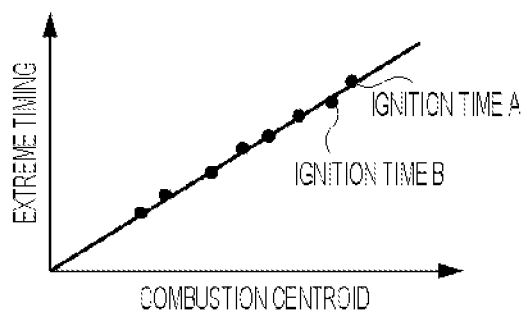
FIG. 11 is a graph illustrating a correlation between an extreme timing of a crank rotation speed and a combustion centroid when the conventional average number N of cycles is set to a large value (N to 100).

FIG. 11 is a graph illustrating a correlation between an extreme timing of a crank rotation speed and the combustion centroid MFB50 when the average number N of cycles is set to a large value (N to 100). In FIG. 11, the horizontal axis represents the combustion centroid MFB50 (written as "combustion centroid" in the drawing), and the vertical axis represents the extreme timing. Here, N to 100 means that the average number N of cycles is substantially "100". FIG. 11 illustrates a comparison result between the combustion centroid MFB50 and the extreme timing of the crank rotation speed for the eight ignition times represented by black dots in the drawing.

Accordingly, the extreme timing calculating unit 302 performs a cycle averaging process of the extreme timing (S12 in FIG. 9) with the average number N of cycles (N to 100) which is large enough to sufficiently remove the cycle variation. As illustrated in FIG. 11, when the average number N of cycles is set to a large value (N to 100), there is a strong correlation between the combustion centroid MFB50 and the extreme timing of the crank rotation speed. In this respect, the combustion state estimating unit 304 stores in advance an expression indicating the correlation between the extreme timing and the combustion centroid MFB50.

In a conventional control device, a correlation expression of the extreme timing and the combustion centroid MFB50 represented by a straight line in FIG. 11 is obtained in advance by calibration or the like, and a current combustion centroid is obtained based on the extreme timing of the current crank rotation speed and the correlation expression. The combustion centroid MFB50 illustrated in FIG. 11 is, for example, a measured value measured using an in-cylinder pressure sensor or the like. Accordingly, the extreme timings represented by ignition times A and B in FIG. 11 are found substantially on a straight line, and this indicates that there is little variation.

As described above, in order for the conventional control device to calculate the combustion centroid, it is necessary to wait for the calculation processing of the combustion centroid until the cycle averaging process is completed. In FIG. 11, since the conventional control device selects, as the average number N of cycles, a value (N to 100) large enough to sufficiently remove the cycle variation, a long waiting time is taken until the conventional control device calculates the combustion centroid. This means that the responsiveness of the estimation of the combustion centroid deteriorates.

On the other hand, when the conventional control device selects a small value (N to 10) as the average number N of cycles, the responsiveness of the estimation of the combustion centroid is improved, but the estimation accuracy of the combustion centroid deteriorates this time. Here, N to 10 means that the average number N of cycles is substantially "10".

Figure 12:
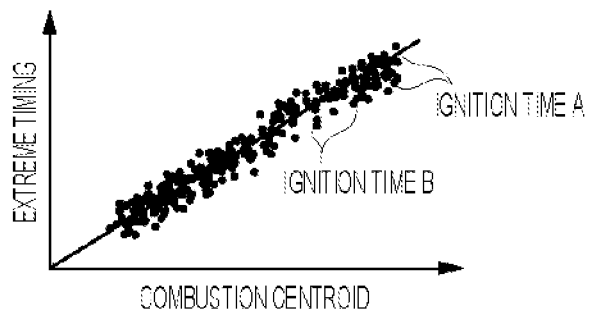
FIG. 12 is a graph illustrating a correlation between an extreme timing of a crank rotation speed and a combustion centroid when the conventional average number N of cycles is set to a small value (N to 10).

FIG. 12 is a graph illustrating a correlation between the extreme timing of the crank rotation speed and the combustion centroid when the average number N of cycles is changed to a small value (N to 10) illustrated in FIG. 11. In FIG. 12, the horizontal axis represents the combustion centroid MFB50 (written as "combustion centroid" in the drawing), and the vertical axis represents the extreme timing. In addition, the number of ignition times illustrated in FIG. 12 is eight as in FIG. 11.

As illustrated in FIG. 12, when the average number of cycles is small, the combustion centroid MFB50 and the extreme timing of the crank rotation speed vary even at the same ignition times (for example, the ignition times A and B), and a large number of times are plotted around the straight line of FIG. 12. Therefore, the conventional control device cannot completely remove the cycle variation, and the correlation between the extreme timing of the crank rotation speed and the combustion centroid deteriorates. This means that the estimation accuracy of the combustion centroid deteriorates.

As described above, in the conventional control device that estimates the combustion centroid using the extreme timing of the crank rotation speed, the estimation accuracy of the combustion state and the responsiveness of the estimation are in a trade-off relationship. This is as described with reference to FIG. 1.

In this respect, the combustion state estimating unit (combustion state estimating unit 304) according to the first embodiment estimates the combustion phase (combustion centroid MFB50) at which the mass fraction burned of the internal combustion engine (engine 100) becomes the set value based on the average rotation speed and the extreme timing at which an extreme of the crank rotation speed is obtained. The set value is, for example, 50%. A process of estimating the combustion centroid by the combustion state estimating unit 304 will be described with reference to FIGS. 13 and 14.

Figure 13:
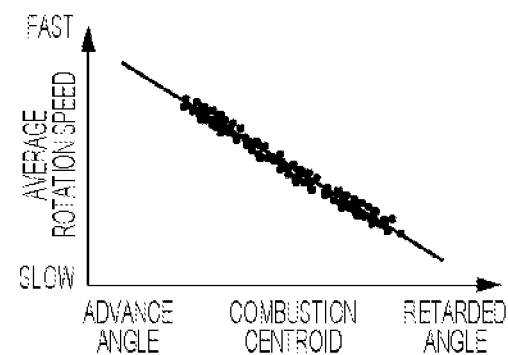
FIG. 13 is a graph illustrating a correlation between an average rotation speed of crank rotation speeds and a combustion centroid at the same ignition time according to the first embodiment of the present invention.

FIG. 13 is a graph illustrating a correlation between the average rotation speed of crank rotation speeds and the combustion centroid at the same ignition time. In FIG. 13, the horizontal axis represents the combustion centroid, and the vertical axis represents the average rotation speed. FIG. 13 illustrates an intersection of the combustion centroid and the average rotation speed when the ignition time is the same.

FIG. 13 illustrates that when the combustion centroid is retarded, the average rotation speed decreases, and when the combustion centroid is advanced, the average rotation speed increases. As illustrated in FIG. 13, at the same ignition time, the combustion centroid has a substantially constant value when the cycle variation is small.

Assuming the same ignition time, there is a correlation between the average rotation speed of the crank rotation speeds and the combustion centroid. The reason for this will be described below.

Figure 14:
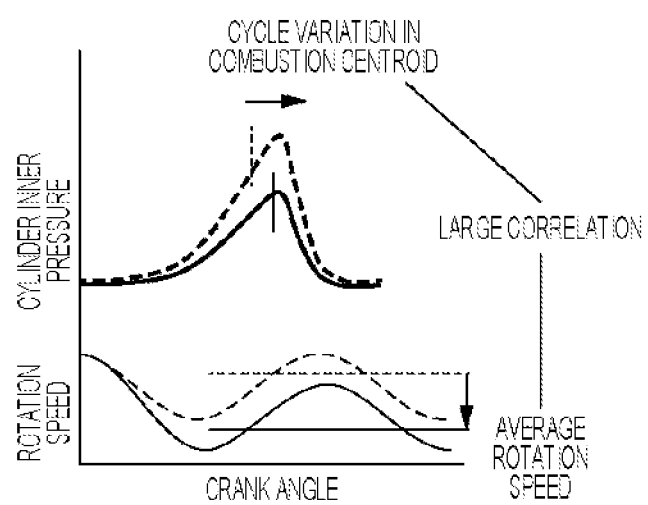
FIG. 14 is a graph illustrating a relationship between an in-cylinder pressure and a rotation speed with respect to a crank angle according to the first embodiment of the present invention.

FIG. 14 is a graph illustrating a relationship between an in-cylinder pressure and a rotation speed with respect to a crank angle. In FIG. 14, the horizontal axis represents the crank angle, and the vertical axis represents the in-cylinder pressure and the rotation speed.

The broken line in FIG. 14 represents a change in the in-cylinder pressure and the rotation speed before a change in average rotation speed, and the solid line in the drawing represents a change in the in-cylinder pressure and the rotation speed after the change in average rotation speed.

Retardation of the combustion centroid due to cycle variation means a decrease in combustion speed and leads to a decrease in in-cylinder pressure and a decrease in combustion torque. When the combustion torque is decreased, a force to push down the piston 10 of the cylinder is decreased, and the crank rotation speed of the cylinder is decreased. Hence, at the same ignition time, a correlation appears between the average rotation speed of the crank rotation speeds and the combustion centroid. As can be seen from FIG. 14, there is a significant correlation between a decrease in the average rotation speed of the crank rotation speeds and an increase in the cycle variation of the combustion centroid.

Figure 15:
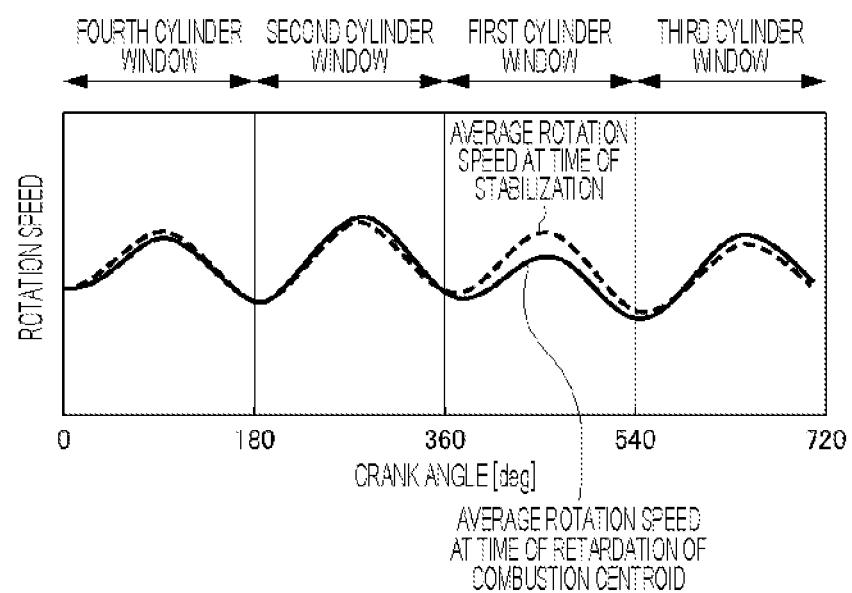
FIG. 15 is a graph indicating that an average rotation speed of crank rotation speeds of a first cylinder decreases when a combustion centroid of only the first cylinder is retarded at the same ignition time according to the first embodiment of the present invention.

FIG. 15 is a graph indicating that an average rotation speed of crank rotation speeds of the first cylinder decreases when the combustion centroid of only the first cylinder is retarded at the same ignition time. In FIG. 15, the horizontal axis represents the crank angle, and the vertical axis represents the average rotation speed. The broken line in the drawing represents the average rotation speed of the crank rotation speeds when the combustion centroid is stable, and the solid line represents the average rotation speed of the crank rotation speeds that has been decreased as the combustion centroid of the first cylinder is retarded.

In a cycle (solid line) in which the combustion centroid of the first cylinder is retarded, the crank rotation speed in the window of the first cylinder decreases as a whole with respect to a cycle (broken line) in which all the cylinders take an average combustion centroid with respect to the cycle variation, and thus, the average rotation speed is decreased.

The combustion state estimating unit 304 can improve the estimation accuracy of the combustion centroid without deteriorating the responsiveness of the estimation of the combustion centroid by using the correlation between the extreme timing of the crank rotation speed and the combustion centroid and the correlation between the average rotation speed of the crank rotation speeds and the combustion centroid.

Here, an expression for calculating the combustion phase in which the mass fraction burned becomes the set value based on the extreme timing and the average rotation speed of the crank rotation speeds by the combustion state estimating unit 304 is obtained in advance by calibration or the like. Accordingly, the expression for calculating the combustion phase is stored in the ROM 204 of the internal combustion engine control device 200 in a form of a polynomial or a reference map.

The combustion state estimating unit 304 obtains the combustion phase using a correlation expression read from the ROM 204 based on the extreme timing of the crank rotation speeds delivered from the extreme timing calculating unit 302 and the average rotation speed of the crank rotation speeds delivered from the average rotation speed calculating unit 303. A combustion phase is obtained for each cylinder in the same procedure, and the combustion phase is delivered to the ignition time computing unit 305.

Moreover, the combustion state estimating unit 304 may use a neural network as means for calculating the combustion phase from the extreme timing and the average rotation speed of the crank rotation speeds. In this case, a weight and a bias of each node in the neural network are stored in the ROM 204 of the internal combustion engine control device 200.

Processing from the rotation speed calculating unit 301 to the ignition time computing unit 305 in the combustion controller 300 is executed for each prescribed number of cycles. For example, when the number of cycles is prescribed as 10 cycles, the combustion controller 300 calculates the extreme timing and the average rotation speed from the calculated rotation speeds based on the crank angle sensor signal for 10 cycles and then estimates the combustion state to compute the ignition time. Thereafter, the combustion controller 300 performs processing for the next 10 cycles.

Figure 16:
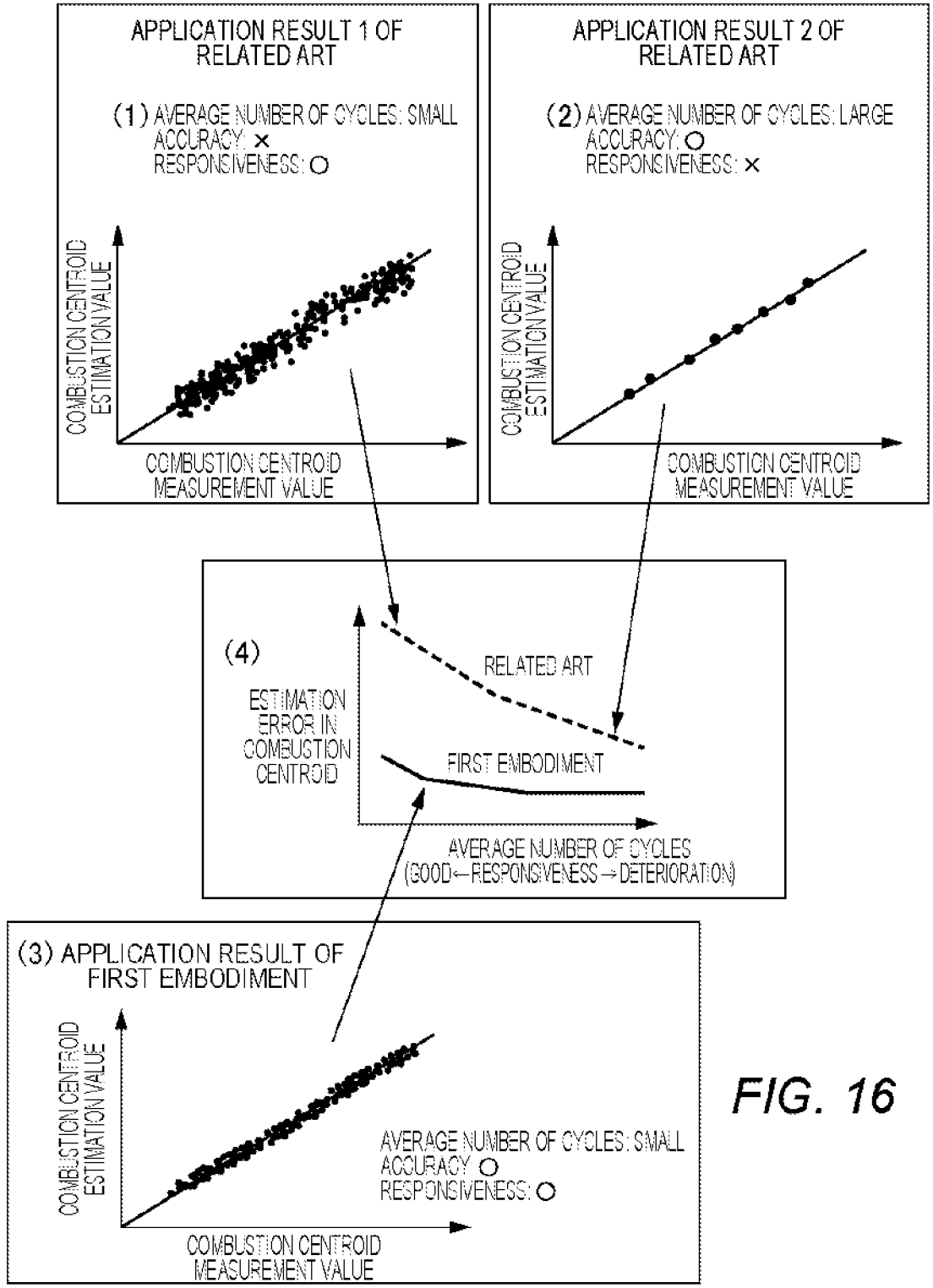
FIG. 16 illustrates graphs obtained by comparing an application result of the first embodiment of the present invention with an application result of the related art.

FIG. 16 illustrates graphs obtained by comparing an application result of the first embodiment with an application result of the related art.

As already described with reference to FIG. 1, in the related art, the estimation accuracy and the responsiveness of the estimation are in a trade-off relationship.

As illustrated in a graph (1) of Application Result 1 of the related art provided at an upper left-hand portion of FIG. 16, in a case where the average number of cycles is small, the responsiveness of the estimation of the combustion centroid is excellent, but the estimation accuracy is poor.

In addition, as illustrated in a graph (2) of Application Result 2 of the related art provided at the upper right-hand portion of FIG. 16, when the average number of cycles is large, the estimation accuracy of the combustion centroid is good, but the responsiveness of the estimation is poor.

A graph (3) of an application result of the first embodiment provided at a lower portion of FIG. 16 illustrates a relationship between a measured combustion centroid value and an estimated combustion centroid value in a case where the average number of cycles is small. The graph (3) illustrates that even when the average number of cycles is small, the variation in the measured combustion centroid value and the estimated combustion centroid value is reduced as compared with the graph (1) illustrated in FIG. 1. That is, even when the average number of cycles is small, the estimation accuracy can be improved.

In a graph (4) obtained by comparing the application result of the first embodiment provided in the middle of FIG. 16 with the application result of the related art, two graphs are illustrated. The application result of the related art is the same as the graph (3) of FIG. 1, but it can be known that the application result of the first embodiment indicates that an estimation error in the combustion centroid is smaller than an estimation error in the combustion centroid according to the related art regardless of the number of average cycles.

That is, the combustion state estimating unit 304 according to the first embodiment can achieve both the estimation accuracy and the estimation responsiveness.

The ignition time computing unit (ignition time computing unit 305) computes the ignition time so that the combustion phase (combustion centroid) estimated by the combustion state estimating unit 304 becomes the target combustion phase and performs combustion control of the internal combustion engine (engine 100). The target combustion phase is, for example, a specific value stored in the ROM 204 and is read by the ignition time computing unit 305. In order to increase the thermal efficiency of the engine, it is necessary to appropriately control the combustion phase. The combustion phase is too fast, work of compressing a gas in the compression stroke increases, so that a loss increases.

In addition, when the combustion phase is too slow, an exhaust temperature rises, and a heat loss due to the exhaust increases. The combustion phase at which the thermal efficiency is maximized is stored in advance as a target combustion phase in the ROM 204 of the internal combustion engine control device 200. The ignition time computing unit 305 adjusts the ignition time to reduce the deviation between the estimated combustion phase and the target combustion phase.

In the internal combustion engine control device 200 according to the first embodiment described above, regardless of the change in the average number of cycles, the estimation error in the combustion centroid calculated by a technique according to the first embodiment can be made smaller than the estimation error in the combustion centroid calculated by a technique performed in the related art. Therefore, the combustion state estimating unit 304 estimates the combustion state of the engine 100 while achieving both the estimation accuracy of the combustion state and the responsiveness of the estimation, and the ignition time computing unit 305 outputs the ignition time computed based on the estimated combustion state to the ignition output circuit 208. In this manner, the engine 100 is controlled.

Here, since the combustion centroid can be accurately estimated with the average number of cycles (for example, 10 cycles) which is good in responsiveness, the control of the engine 100 can also be performed well.

Needless to say, the combustion centroid can be accurately estimated and the engine 100 can be controlled satisfactorily even with the average number of cycles (for example, 100 cycles) which deteriorates the responsiveness.

Second Embodiment

Next, an internal combustion engine control device according to a second embodiment of the present invention will be described with reference to FIG. 17.

Figure 17:
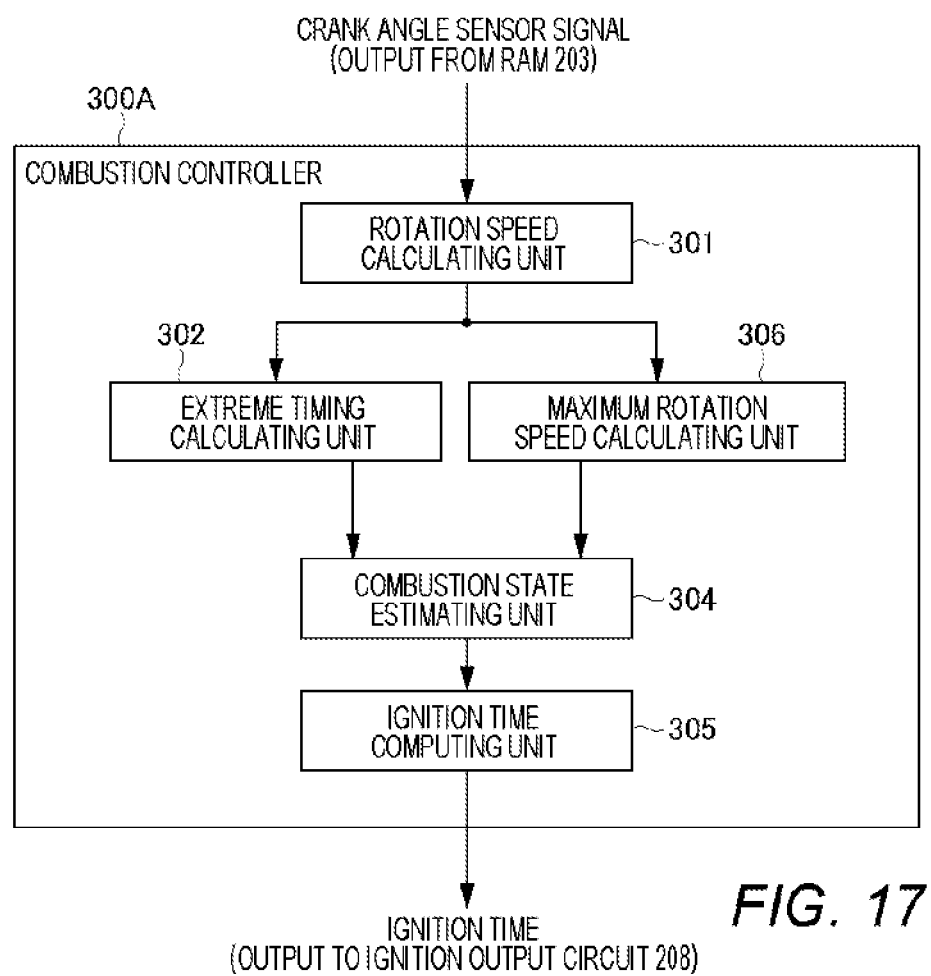
FIG. 17 is a block diagram illustrating a configuration example of a combustion controller according to a second embodiment of the present invention.

FIG. 17 is a block diagram illustrating an internal configuration example of a combustion controller 300A provided in an internal combustion engine control device 200 according to the second embodiment.

The combustion controller 300A has a configuration in which the average rotation speed calculating unit 303 of the combustion controller 300 according to the first embodiment is replaced with a maximum rotation speed calculating unit 306. As illustrated in FIG. 15, when the combustion centroid is retarded due to the cycle variation at the same ignition time, the crank rotation speed decreases as a whole in the window of the cylinder. Hence, the average rotation speed of the crank rotation speeds according to the first embodiment is replaced with a maximum rotation speed of the crank rotation speeds.

Accordingly, the combustion controller 300A includes a rotation speed calculating unit (rotation speed calculating unit 301) that calculates crank rotation speeds of the internal combustion engine (engine 100), an extreme timing calculating unit (extreme timing calculating unit 302) that calculates an extreme timing of the crank rotation speeds, the maximum rotation speed calculating unit (maximum rotation speed calculating unit 306) that calculates a maximum rotation speed of the crank rotation speeds, and a combustion state estimating unit (combustion state estimating unit 304) that estimates a combustion state of the internal combustion engine (engine 100) based on the extreme timing and the maximum rotation speed.

The combustion state estimating unit (combustion state estimating unit 304) estimates a combustion phase in which the mass fraction burned of the internal combustion engine (engine 100) becomes a set value based on the extreme timing at which the crank rotation speeds become an extreme value and the maximum rotation speed, and an ignition time computing unit (ignition time computing unit 305) performs combustion control of the internal combustion engine (engine 100) such that the estimated combustion phase becomes a target combustion phase. Here, the maximum rotation speed calculating unit (maximum rotation speed calculating unit 306) sets a maximum value of a crank rotation speed series allocated to each cylinder as the maximum rotation speed of the cylinder.

Modification Example

The combustion state estimated by the combustion state estimating unit 304 is set to the combustion centroid MFB50 in each of the above-described embodiments; however, the combustion state may be changed to a value other than the combustion centroid MFB50 (for example, the combustion phase when the mass fraction burned is 60%).

The present invention is not limited to the above-described embodiments, and it is needless to say that various other application examples and modification examples can be made without departing from the gist of the present invention described in the claims.

For example, the above-described embodiments describe the configuration of the system in detail and specifically in order to describe the present invention in an easy-to-understand manner, and the present invention is not necessarily limited to embodiments having all the described configurations. In addition, it is also possible to add, remove, and replace other configurations with respect to a part of the configurations of the present embodiments.

In addition, control lines and information lines indicate what is considered to be necessary for the description and do not necessarily indicate all the control lines and the information lines on a product. In practice, it may be considered that almost all of the configurations are connected to each other.

REFERENCE SIGNS LIST

10 piston
11 crank angle sensor
13 signal rotor
20 crankshaft
100 engine
200 internal combustion engine control device
300 combustion controller
301 rotation speed calculating unit
302 extreme timing calculating unit
303 average rotation speed calculating unit
304 combustion state estimating unit
305 ignition time computing unit

The invention claimed is:

1. An internal combustion engine control device comprising:
a rotation speed calculating unit that is operatively connected to an internal combustion engine and that detects a time difference $\Delta t$ between adjacent signal teeth of each predetermined crank angle, passing a detection portion of a crank angle sensor, and calculates crank rotation speeds of an internal combustion engine based on the time difference $\Delta t$;
an extreme timing calculating unit that is operatively connected to the internal combustion engine and that calculates an extreme timing at which the crank rotation speeds become an extreme value;
an average rotation speed calculating unit that is operatively connected to the internal combustion engine and that calculates an average rotation speed of the crank rotation speeds;
a combustion state estimating unit that is operatively connected to the internal combustion engine and that estimates a combustion phase in which a mass fraction burned in the internal combustion engine becomes a set value based on the extreme timing at which the crank rotation speeds become the extreme value and the average rotation speed; and
an ignition time computing unit that is operatively connected to the internal combustion engine and that calculates an ignition time for performing combustion control of the internal combustion engine so that the combustion phase estimated by the combustion state estimating unit becomes a target combustion phase.

2. The internal combustion engine control device according to claim 1, wherein the rotation speed calculating unit divides a crank rotation speed series in a period in which a crank angle is 720° by the number of cylinders and allocates the crank rotation speed series in a period including an expansion stroke of each cylinder as the crank rotation speed series in the cylinder.

3. The internal combustion engine control device according to claim 1, wherein the average rotation speed calculating unit sets an average value of a crank rotation speed series allocated to each cylinder as an average rotation speed of the cylinder.

4. The internal combustion engine control device according to claim 1, wherein the combustion state of the internal combustion engine is the combustion phase when a mass fraction burned becomes 50%.

5. An internal combustion engine control device comprising:
a rotation speed calculating unit that is operatively connected to an internal combustion engine and that detects a time difference $\Delta t$ between adjacent signal teeth of each predetermined crank angle, passing a detection portion of a crank angle sensor, and calculates crank rotation speeds of an internal combustion engine based on the time difference $\Delta t$;
an extreme timing calculating unit that is operatively connected to the internal combustion engine and that calculates an extreme timing at which the crank rotation speeds become an extreme value;
a maximum rotation speed calculating unit that is operatively connected to the internal combustion engine and that calculates a maximum rotation speed of the crank rotation speeds;
a combustion state estimating unit that is operatively connected to the internal combustion engine and that estimates a combustion phase in which a mass fraction burned in the internal combustion engine becomes a set value based on the extreme timing at which the crank rotation speeds become the extreme value and the average rotation speed; and
an ignition time computing unit that is operatively connected to the internal combustion engine and that calculates an ignition time for performing combustion control of the internal combustion engine so that the combustion phase estimated by the combustion state estimating unit becomes a target combustion phase.

\* \* \* \* \*